United States Patent
Leutfeld et al.

(10) Patent No.: US 9,617,371 B2
(45) Date of Patent: Apr. 11, 2017

(54) POLYUREAS AS RHEOLOGY CONTROL AGENTS

(75) Inventors: Daniela Leutfeld, Wesel (DE); Bianca Morhenn, Krefeld (DE); Marc Eberhardt, Wesel (DE); Ina Kober, Oberhauser (DE); Jürgen Omeis, Dorsten-Lembeck (DE); Sylvia Bühne, Duisburg (DE); Berthold Jacobs, Reken (DE)

(73) Assignee: BYK-Chemie GmbH, Wesel (DE)

( * ) Notice: Subject to any disclaimer, the term of this patent is extended or adjusted under 35 U.S.C. 154(b) by 586 days.

(21) Appl. No.: 13/395,006

(22) PCT Filed: Sep. 3, 2010

(86) PCT No.: PCT/EP2010/005426
§ 371 (c)(1),
(2), (4) Date: May 23, 2012

(87) PCT Pub. No.: WO2011/029556
PCT Pub. Date: Mar. 17, 2011

(65) Prior Publication Data
US 2012/0226075 A1    Sep. 6, 2012

(30) Foreign Application Priority Data
Sep. 8, 2009  (EP) .................................... 09011490

(51) Int. Cl.
*C08G 18/32* (2006.01)
*C08G 18/28* (2006.01)
(Continued)

(52) U.S. Cl.
CPC ......... *C08G 18/324* (2013.01); *C08G 18/283* (2013.01); *C08G 18/284* (2013.01);
(Continued)

(58) Field of Classification Search
None
See application file for complete search history.

(56) References Cited

U.S. PATENT DOCUMENTS

| 4,311,622 A | 1/1982 | Buter |
| 4,314,924 A | 2/1982 | Haubennestel et al. |

(Continued)

FOREIGN PATENT DOCUMENTS

| CA | 2352660 A1 | 2/2002 |
| CN | 1495211 A | 5/2004 |

(Continued)

OTHER PUBLICATIONS

"International Application No. PCT/EP2010/005426, International Preliminary Report on Patentability mailed Sep. 16, 2011", (Sep. 16, 2011), 7 pgs.

(Continued)

*Primary Examiner* — Clinton Brooks
(74) *Attorney, Agent, or Firm* — Schwegman Lundberg & Woessner, P.A.

(57) ABSTRACT

The invention relates to polyureas having a weight-average molecular weight ranging from 5,000 to 70,000 g/mol, the preparation thereof, and the use thereof as rheology control agents. The invention further relates to rheology control agents containing polyureas and to the use thereof. The invention moreover relates to formulations containing polyureas.

15 Claims, 1 Drawing Sheet

Test for temperature-stable effect

(51) Int. Cl.
    *C08G 18/50*     (2006.01)
    *C08G 18/70*     (2006.01)
    *C08G 18/71*     (2006.01)
    *C08G 18/73*     (2006.01)
    *C08G 18/75*     (2006.01)
    *C08G 18/76*     (2006.01)
    *C09D 7/00*     (2006.01)
    *C08L 75/02*     (2006.01)

(52) U.S. Cl.
    CPC ..... *C08G 18/3228* (2013.01); *C08G 18/3271* (2013.01); *C08G 18/5024* (2013.01); *C08G 18/706* (2013.01); *C08G 18/711* (2013.01); *C08G 18/73* (2013.01); *C08G 18/755* (2013.01); *C08G 18/7621* (2013.01); *C09D 7/002* (2013.01); *C08L 75/02* (2013.01)

(56) References Cited

U.S. PATENT DOCUMENTS

| | | | |
|---|---|---|---|
| 4,677,028 | A | 6/1987 | Heeringa et al. |
| 4,851,294 | A | 7/1989 | Buter et al. |
| 5,554,586 | A | 9/1996 | Pratt |
| 6,617,468 | B2 * | 9/2003 | Haubennestel et al. ........ 560/25 |
| 6,870,024 | B2 | 3/2005 | Haubennestel et al. |
| 2005/0182205 | A1 | 8/2005 | Guha et al. |
| 2006/0052261 | A1 | 3/2006 | Kray et al. |

FOREIGN PATENT DOCUMENTS

| | | |
|---|---|---|
| CN | 1754901 A | 4/2006 |
| DE | 10241853 B3 | 1/2004 |
| EP | 0006252 A1 | 1/1980 |
| EP | 0198519 A1 | 10/1986 |
| EP | 1188779 A1 | 3/2002 |
| EP | 1630191 A2 | 3/2006 |
| JP | 6166769 A | 4/1986 |
| WO | WO-9509201 A1 | 4/1995 |
| WO | WO-0204579 A1 | 1/2002 |

OTHER PUBLICATIONS

"International Application No. PCT/EP2010/005426, International Preliminary Report and Written Opinion mailed Nov. 22, 2010", (Sep. 22, 2011), 11 pgs.

"European Application Serial No. EP09011490.1, European Search Report mailed Feb. 8, 2010", 5 pgs.

"International Application No. PCT/EP2010/005426, English Translation of International Preliminary Report on Patentability mailed Mar. 15, 2012", 10 pgs.

Zhang, S., et al., "Physical Properties of Ionic Liquids: Database and Evaluation", *J. Phys. Chem. Ref. Data*, 35(4), (2006), 1475-1517.

"Japanese Application Serial No. 2012-528256, Office Action mailed Oct. 29, 2013", w/English translation, 5 pgs.

* cited by examiner

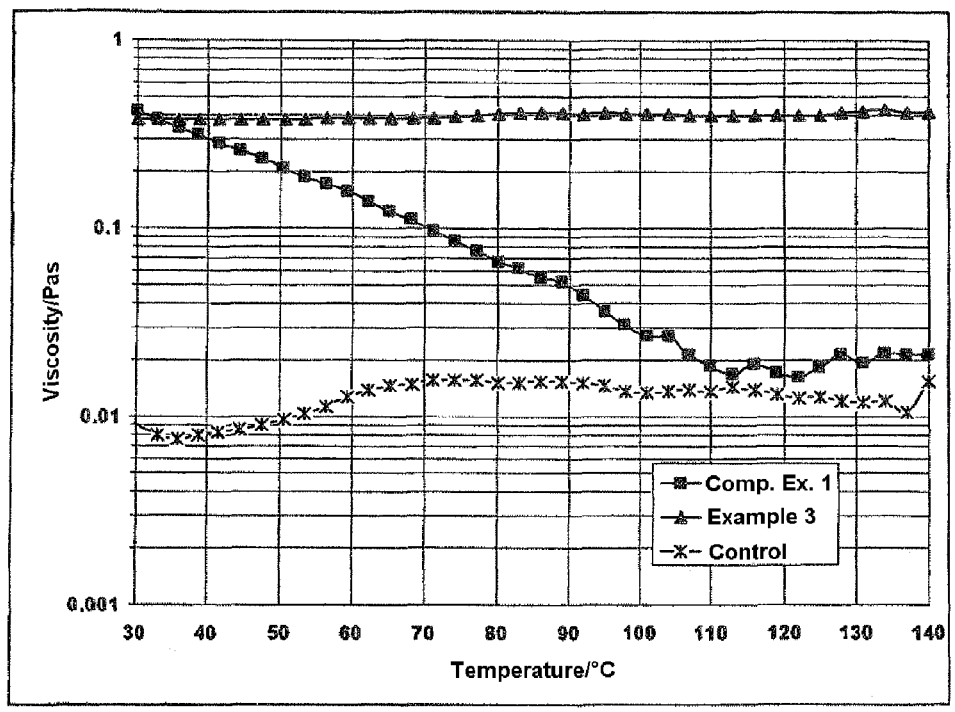
Test for temperature-stable effect

POLYUREAS AS RHEOLOGY CONTROL AGENTS

PRIORITY CLAIM TO RELATED APPLICATIONS

This application is a national stage application under 35 U.S.C. §371 of PCT/EP2010/005426, filed Sep. 3, 2010, and published as WO 2011/029556 A1 on Mar. 17, 2011, which claims priority to European Application No. 09011490.1, filed Sep. 8, 2009, which applications and publication are incorporated herein by reference and made a part hereof in their entirety, and the benefit of priority of each of which is claimed herein.

The invention relates to polyureas, their preparation, and their use as rheology control agents. Additionally the invention relates to rheology control agents comprising polyureas and to their use. The invention further relates to formulations comprising polyureas.

The rheology of liquid coating systems is controlled using primarily organically modified bentonites, silicas, hydrogenated castor oil, and polyamide waxes. These substances are mostly dry solids, which must be processed to a semifinished form using solvents and shearing forces, and/or introduced into the liquid coating system by means of targeted temperature control if these temperatures are not observed, crystallites occur in the finished coating system, and can lead to defects in the coating.

These rheological auxiliaries frequently lead to instances of clouding and haze in clear, transparent coatings. Moreover, operating with dry, powderous products, which cause dusts during processing, may be technologically unfavorable.

Other solutions for rheology control have been set out in European patent application EP-A-0198519. Here, an isocyanate is reacted with an amine, in the presence of solutions of film-forming resin, to form a urea, which forms microcrystalline, needle-shaped crystals. These film-forming binders, thus modified, are used as rheology control binders and sag-preventing binders, in the form of what are called "sag control agents".

Other proposals for rheology control are described in U.S. Pat. No. 4,311,622 and U.S. Pat. No. 4,677,028, where polyisocyanates or polyisocyanurates are reacted with monoamines or poly-amines in the mandatory presence of a binder, to form polyureas.

WO 02/04579 describes ureas which are used for thickening fats or oils. These thickeners are prepared by stoichiometric reaction of primary amines with diisocyanates in the fat or oil which is to be thickened.

Patent specification U.S. Pat. No. 5,554,586 likewise describes the thickening of oils in situ. In this case, a mixture of primary monofunctional amines with polyoxyalkylene diamines is reacted with diisocyanates in the oil to be thickened.

Specifications US 2005/0182205 and WO 95/09201 both describe the thickening of molding compounds (bulk molding compounds, BMC, and sheet molding compounds, SMC) using urea derivatives that are obtained by reacting isocyanates with diamines or triamines. As the isocyanate component it is possible to use aliphatic, aromatic diisocyanates, but also reaction products of diisocyanates with polyetherdiols or polyesterdiols. As the amine component, low molecular weight diamines and triamines, and polyamines, are employed. The urea compounds are prepared by mixing the amine component and isocyanate component in the corresponding resin.

The disadvantage of all of the products described in the prior art is that they always have to be prepared in the medium which is to be thickened, and whose rheology they are supposed to influence. The products, therefore, are not independent of the medium to be thickened. They are not stable on storage, but instead exhibit lumps and/or bits after a short time. A further disadvantage is that these thixotroped media have to be prepared with the aid of a pre-gel. This viscous pre-gel must typically be processed immediately after its preparation, since after a prolonged standing time it can no longer be incorporated without disruption. Subsequent correction of completed formulations is therefore not possible. The rheology control agents of the prior art cannot be prepared alone, but only in the presence of film-forming agents. Their usefulness is therefore limited.

EP 11.88779 describes a process for preparing a solution which is effective as a thixotropic agent and comprises urea-urethanes, and use of this solution for the thickening of coating materials. These urea-urethanes are obtained by reacting monohydroxy compounds with an excess of tolylene diisocyanate, removing the unreacted portion of the tolylene diisocyanate from the reaction mixture, and further reacting the resulting monoisocyanate adducts with diamines in a molar ratio of 2:1, in a solvent, to form urea-urethanes. EP-A-0006252 describes analogous urea-urethanes, which are obtained by stoichiometric reaction of monohydroxy compounds with diisocyanates and diamines.

Patent specification DE 10241853 B3 describes polymeric urea-urethanes obtainable by a first reaction of an excess of diisocyanate with a polyol, to form a double-sidedly NCO-terminated urethane polymer, present alongside excess diisocyanate, and subsequent second reaction of the mixture of the double-sidedly NCO-terminated urethane prepolymer and the excess diisocyanate, on the one hand, and a mixture of a primary monoamine and a primary diamine, on the other. Reaction media used are polar aprotic solvents. The urea-urethane solutions obtained in this way are used as rheology control agents in liquid polymer systems.

The disadvantage of these urea-urethanes is the limited shear stability, and also the thixotropy, which is very strongly pronounced according to the application. This means that the viscosity after shearing as a result of the application is built up again only after a time delay, and hence a poor anti-sag effect is obtained.

Patent specification EP 1 630 191 describes a process for producing (poly)urea powders by means of spray drying. The (poly)urea powders obtained may consist either of monourea compounds or of polyurea compounds, and preferably have a low molecular weight. These (poly) urea compounds preferably have only a few urea groups. The (poly)urea powders are intended for use in compositions which are said to be suitable as lubricants, thickeners and/or processing agents. For these purposes the (poly) urea powders are intended for dispersion into a base oil and/or solvent. During the preparation or the use, the (poly) urea particles are present in the form of a solid or suspension.

It was an object of the present invention, therefore, to provide new rheology control agents. These new agents ought not to have the disadvantages stated in the abovementioned specifications. More particularly the intention was to find rheology control agents which are storage-stable. Furthermore, the rheology control agents ought not to be tied to the medium to be thickened, such as the binder, but instead to be able to be added as a completed additive at any point in a process for producing formulations. These additives are also to be easy to process over a relatively long time period, while having a good and wide compatibility and a low level of thixotropy.

The new rheology control agents ought to be distinguished by a strong rheological activity and a good shear stability. Moreover, they ought to be suitable for adjusting the sagging characteristics of high-build systems in accordance with DIN EN ISO 12944 which are applied by spray application. They ought additionally to be less temperature-dependent than the rheology control agents of the prior art, thereby allowing them to be used for theological control of baking systems and in coating operations which take place at relatively high temperatures, i.e., more particularly, at temperatures of 70° C. to 180° C. The rheology control agents ought additionally to be useful as antisettling agents for increasing the storage stability and for reducing the tendency of paints or coating materials to sag in systems comprising polar solvents such as alcohols and ketones, as well, the rheology control, agents ought to exhibit good compatibility and a good rheological activity. With this class of substance it ought to be possible to obtain rheology control agents for use in media with different polarities.

It is desirable, furthermore, for the new rheology agents to be easily obtainable and easy to process, it being an advantage if they are dust-free and can be incorporated without great cost or complexity into other systems. Moreover, they ought ideally to be transparent and to have no tendency to form bits in paints, for example. In one particularly desirable embodiment, therefore, the rheology agents are to be in the form of a solution.

Surprisingly it has been found that these objects can be achieved by means of polyureas of the general formula (I)

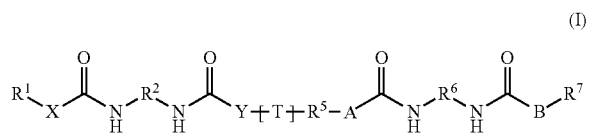

(I)

as a new substance class of rheology control agents, in which the variables have the following definitions:

T is a polymeric unit which comprises at least 4 urea groups, $R^1$ and $R^7$ independently of one another are branched or unbranched $C_4$-$C_{32}$ alkyl, $C_3$-$C_{18}$ alkenyl, $C_2$-$C_{20}$ alkynyl, $C_3$-$C_{20}$ cycloalkyl, $C_3$-$C_{20}$ cycloalkenyl, $C_5$-$C_{12}$ aryl or arylalkyl, $C_mH_{2m+1}$ (O—$C_nH_{2n}$)$_p$—(O—CH($C_6H_5$)—$CH_2$)$_u$—, U—$C_6H_4$—($CH_2$)$_s$—(O—$C_nH_{2n}$)$_x$—(O—CH($C_6H_5$)—$CH_2$)$_u$—$C_mH_{2m+1}$(O—$C_nH_{2n}$)$_p$—(O—CH($C_6H_5$)—$CH_2$)$_u$—(OOC—$C_vH_{2v}$)$_x$—, U—$C_6H_4$—($CH_2$)$_s$—(O—$C_nH_{2n}$)$_p$—(O—CH($C_6H_5$)—$CH_2$)$_u$—(OOC—$C_vH_{2v}$)$_x$—, $C_4$-$C_{32}$-hydroxyalkyl, $C_4$-$C_{32}$-carboxyalkyl, —$C_mH_{2m}$C(=O)$R^8$—, —$C_mH_{2m}$COOR$^8$—, —$C_mH_{2m}$C(=O)NR$^8$R$^9$— or —$C_mH_{2m}$OC(=O)NR$^8$R$^9$ radicals, it being possible for the radicals to be substituted or unsubstituted, it being possible for the amino groups and/or carboxyl groups to be present in salified or quaternized form, and $C_mH_{2m}$ being a linear or branched alkylene group, and $R^8$ and $R^9$ independently of one another are hydrogen, branched or unbranched $C_1$-$C_{32}$ alkyl, $C_3$-$C_{18}$ alkenyl, $C_2$-$C_{20}$ alkynyl, $C_3$-$C_{20}$ cycloalkyl, $C_3$-$C_{20}$ cycloalkenyl, $C_5$-$C_{12}$ aryl or arylalkyl, $C_1$-$C_{32}$ alkoxyalkyl or $C_1$-$C_{32}$ acyloxyalkyl groups, where m=0-32, n=2-4, x=0-100, u=0-100, v=1-22, p=0-100, s=0-1, U=H, $C_1$-$C_{12}$ alkyl or —$C_6H_5$)$_{1-4}$, $R^2$ and $R^6$ independently of one another are branched or unbranched $C_4$-$C_{22}$ alkylene, $C_3$-$C_{18}$ alkenylene, $C_2$-$C_{20}$ alkynylene, $C_3$-$C_{20}$ cycloalkylene, $C_3$-$C_{20}$ cycloalkenylene, $C_5$-$C_{12}$ arylene or arylalkylene radicals, $R^5$ is a branched or unbranched polyester, polyether, polyamide, $C_4$-$C_{22}$ alkylene, $C_3$-$C_{18}$ alkenylene, $C_2$-$C_{20}$ alkynylene, $C_3$-$C_{20}$ cycloalkylene, $C_3$-$C_{20}$ cycloalkenylene, $C_5$-$C_{12}$ arylene or arylalkylene radical, A, B, X and Y independently of one another are —O— or —NR$^{10}$— with $R^{10}$=H, branched or unbranched $C_1$-$C_{32}$ alkyl, $C_3$-$C_{18}$ alkenyl, $C_2$-$C_{20}$ alkynyl, $C_3$-$C_{20}$ cycloalkyl, $C_2$-$C_{20}$ cycloalkenyl, $C_5$-$C_{12}$ aryl or arylalkyl radicals, the weight-average molecular weight of the polyureas being 5000 to 70000 g/mol.

Surprisingly, polyureas have been found which increase the storage stability and shear stability of formulations. A further surprise was that rheological assistants have been found which comprise these polyureas, with only a slight reduction in the resistance to sagging after shearing not only through polyureas having relatively low weight-average molecular weights up to 24000 g/mol, but also by those having relatively high weight-average molecular weights above 24000 g/mol. More-over, the polyureas of the invention are storage-stable. They are, furthermore, independent of the medium to be thickened, and can be prepared without said medium. They are also easy to process over a relatively long time period, and exhibit a good and broad compatibility and a low level of thixotropy.

The polyureas of the invention are preferably fully reacted compounds, which are unable to enter into any further reaction with constituents in the formulations. The formation of the polyureas in situ, as described, for example, in EP-A-0198519 by combining amine and isocyanate in the presence of the binder, is not an option in the case, for example, of unsaturated polyester resins or UV-curable acrylate paints, since the amines react spontaneously with the binder. In one preferred embodiment the polyureas of the invention are fully reacted systems, meaning that $R^1$, $R^7$, $R^2$, $R^6$, $R^5$, and $R^{10}$ do not have any functional groups which react with the binder system.

In another preferred embodiment, more particularly for use in polar systems such as aqueous media, for example, the radicals $R^1$ and $R^7$ of the polyureas of the invention are substituted and comprise preferably polar functional groups such as amine, OH, carboxyl, ester, nitrile or amide groups or heteroaromatic moieties. The amine groups may be salified or quaternized. Inc carboxyl groups may be salified in the form of carboxylate groups. In another embodiment, the radicals $R^1$ and/or $R^7$, for use in polar systems, comprise polyester groups or polyether groups.

Customary counterions for the protonated, i.e., salified, form of the amino groups are, for example, halides. Customary counterions of the carboxylate groups are alkali, metal ions such as K$^+$ or Na$^+$ or alkaline earth metals. Examples of customary quaternizing agents are alkyl halides, preferably alkyl iodides.

The radicals $R^2$ and $R^6$ are preferably identical or different branched or unbranched $C_5$-$C_{12}$ arylene, $C_5$-$C_{12}$ arylalkylene, $C_3$-$C_{20}$ cycloalkylene or $C_4$-$C_{22}$ alkylene radicals.

The radicals $R^8$ and $R^9$ are preferably, independently of one another, hydrogen or branched or unbranched $C_1$-$C_{32}$ alkyl, $C_1$-$C_{32}$ alkoxyalkyl, $C_5$-$C_{12}$ aryl or arylalkyl radicals.

$R^{10}$ is preferably H or a branched or unbranched. $C_1$-$C_{32}$ alkyl, $C_3$-$C_{20}$ cycloalkyl, $C_5$-$C_{12}$ aryl or arylalkyl radical.

Preferred polyether groups are ethylene oxide and/or propylene oxide and/or butylene oxide and/or styrene oxide groups.

Preferably m is 1-18. In another preferred embodiment x is 0-50. In another preferred embodiment u is 0-50. In another preferred embodiment v is 1-6. In another preferred embodiment p is 0-50.

In one particularly preferred embodiment m is 1-18, x is 0-50, u=0-50, v=1-6, and p=0-50.

The polymeric unit T of the polyureas of the invention according to formula (I) may comprise urethane groups. Preferably the polymeric unit. T comprises no urethane groups. More preferably T comprises no urethane groups, and A and Y in the formula (I) are $NR^{10}$.

In one preferred embodiment the polymeric unit represents a unit of the formula (II):

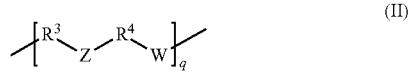

in which
$R^3$ and $R^4$ are each identical or different and independently of one another are branched or unbranched polyester, polyether, polyamide, $C_4$-$C_{22}$ alkylene, alkenylene, $C_2$-$C_{20}$ alkynylene, $C_3$-$C_{20}$ cycloalkylene, $C_3$-$C_{20}$ cycloalkenylene, $C_5$-$C_{12}$ arylene or arylalkylene radicals, Z and W are each identical or different and independently of one another are —NHCOO— or —NH—CO—NH—, and
q is 2-200.

$R^3$, $R^4$, and $R^5$ are preferably branched or unbranched polyester, polyether, polyamide, $C_4$-$C_{22}$ alkylene, $C_3$-$C_{20}$ cycloalkylene, or $C_5$-$C_{12}$ arylene or arylalkylene radicals, it being possible for the radicals $R^3$, $R^4$, and $R^5$ to be identical or different.

Preferably q is 2-150, more preferably p is 2-100, and very preferably q is 2-50.

The weight-average molecular weight of the compounds of the invention is preferably in the range of 5000-60000 g/mol and more preferably of 5000-55000 g/mol.

The weight-average molecular weight is the weight average of the molar mass distribution determined by means of gel permeation chromatography (GPC). The molar mass distribution is determined in accordance with DIN 55672 part 2. The eluent used is a solution of lithium bromide (amount 5 g/l) in dimethylacetamide. Calibration is carried out using narrow-range polymethyl methacrylate standards of linear construction that have molecular weights of between 1000000 and 102. The temperature of the overall GPC system (injector, sample plate, detectors, and columns) is 80° C.

The rheological action of the compounds of the invention is determined primarily by their molecular weight and their polarity.

For high compatibility and rheological activity, the polyureas of the invention can be used for rheology control in systems comprising polar solvents such as alcohol-containing and ketone-containing systems. The higher the weight-average molecular weight, the higher ought to be the polarity of the polyureas. The polarity is achieved preferably by means of polar functional groups, containing the radicals $R^1$ and/or $R^7$, or by polyester groups and polyether groups in the radicals $R^1$ and/or $R^7$. Examples of suitable polar functional, groups are amine, OH, carboxyl, ester, nitrile or amide groups or heteroaromatic moieties, it being possible for the amino groups and carboxyl groups to be salified or quaternized. Carboxyl groups as polar functional groups are preferred.

For high compatibility and rheological activity, polyureas having a weight-average molecular weight of 5000 to 12000 g/mol are preferably used in systems comprising polar solvents. Particularly preferred are polyureas having a weight-average molecular weight of 5000 to 12000 g/mol and having radicals $R^1$ and/or $R^7$ which are substituted by polar functional groups and/or which comprise polyester groups and/or polyether groups.

Pigments and fillers have a tendency to settle during the storage of paints or coating materials and to form sediments which are in some cases decidedly hard, and which are difficult to redisperse, and which hinder processing. This is especially the case during the storage of pigment concentrates or nail varnishes. On application at relatively high film thickness to inclined and vertical surfaces, sag marks are readily formed. Sedimentation and a propensity to sagging are not desired effects. They can be prevented by the polyureas of the invention, thus leading to storage-stable systems. Even at storage temperatures greater than 40° C., the polyureas of the invention are suitable for achieving a temperature-stable antisettling behavior in order to increase the storage stability. A further advantage of the polyureas described is that they reliably prevent sedimentation and propensity to sagging over a wide temperature range from 20 to 200° C., preferably 20 to 150° C., and more preferably from 20 to 100° C. The polyureas of the invention thus act as antisettling agents and prevent propensity to sagging. Polyureas having a weight-average molecular weight of 5000 to 12000 g/mol are preferred in this context.

The polyureas of the invention are also notable for a very broad compatibility. The rheological effect of these products is less temperature-dependent than that of products produced according to the prior art. (e.g., patent specification EP 1188779), thereby allowing them to be used preferentially for rheologic control in baking systems, or in coating operations which take place at relatively high temperatures. DIN EN 971-1 understands baking to be a curing procedure in which the crosslinking of the binder takes place by exposure to heat, with a defined minimum temperature. Baking systems, therefore, are coating materials which are cured by temperature exposure to form a continuous, solid film. This curing takes place typically at relatively high temperatures in the range from 70° C. to 180° C.

Suitability for rheology control in the aforementioned baking systems is possessed preferably by polyureas having a weight-average molecular weight of 10000 to 26000 g/mol, preferably 12000 to 21000 g/mol. Polyester or polyether structures in $R^1$ and $R^7$ are preferred. With very particular preference, ethylene oxide and/or propylene oxide and/or butylene oxide and/or styrene oxide groups are suitable. The radicals $R^1$ and/or $R^7$ may comprise polar functional groups.

The polyureas of the invention are also notable for a strong rheological activity and a good stability to shear. They are therefore of preferential suitability for adjusting, for example, the sagging behavior of high-build systems applied by spray application. According to DIN EN ISO 12944, high-build systems are coatings having a target film thickness ≥80 μm, which are produced in one operation from coating materials that can be processed in a high-build form. These systems are employed preferably as anticorrosion coatings.

For modifying high-build systems it is preferred to use polyureas having a weight-average molar weight of 24000 to 55000 g/mol, preferably 34000 to 50000 q/mol. The radicals $R^1$ and/or $R^7$ may be substituted by polar functional groups and/or may comprise polyester groups and/or polyether groups. Examples of suitable polar functional groups are amine, OH, carboxyl, ester, nitrile or amide groups or heteroaromatic moieties, it being possible for the amino and/or the carboxyl group to be salified or quaternized. Carboxyl groups as polar functional groups are preferred.

The polyureas of the invention can be prepared by four different methods.

Method a. envisages the reaction of at least one diisocyanate with at least one component K containing two NCO-reactive groups. The two components are reacted in a molar ratio of diisocyanate to component K of (f+1):f with f≥1, thus forming, as an intermediate, an isocyanate-terminated urea having on average two free isocyanate groups in the molecule. This is followed by complete reaction of the free isocyanate groups or the intermediate with at least one component L which is reactive toward isocyanate groups. This method is preferred for obtaining polyureas which have a weight-average molecular weight of 24000 to 70000 g/mol.

In a second method b., at least one diisocyanate is reacted with at least one component. K containing two NCO-reactive groups in a molar ratio of diisocyanate to component K of f: (f+1) with f≥1, thus forming an inter-mediate having on average two free isocyanate-reactive, terminal groups in the molecule. This is followed by complete reaction of the free isocyanate-reactive groups of the intermediate with at least one monoisocyanate-functional compound. This method is preferred for obtaining polyureas which have a weight-average molecular weight of 24000 to 70000 g/mol.

In a third method c. a mixture of at least one diisocyanate and at least one monoisocyanate-functional compound reacts with at least one component K containing two NCO-reactive groups. The molar ratio of diisocyanate to component K so monoisocyanate-functional compound is f:(f+1):2 with f≥1. This method is preferred for obtaining polyureas which have a weight-average molecular weight of 5000 to 26000 g/mol.

In a fourth method d. a mixture of at least one component L which is reactive toward isocyanate groups and at least one component K containing two NCO-reactive groups reacts with at least one diisocyanate. The molar ratio of component K to diisocyanate to component t is f:(f+1):2 with f≥1. This method is preferred for obtaining poly-ureas which have a weight-average molecular weight of 5000 to 26000 g/mol.

The numbers f for each method are preferably from 1 to 100, more preferably from 1 to 50, and very preferably from 1 to 30.

The reactions in methods a., b., c., and d. may take place in polar aprotic and apolar aprotic solvents and also in polar and apolar vehicles. It is preferred to use polar aprotic solvents. Examples of suitable polar aprotic solvents are N-methylpyrrolidone, N-ethylpyrrolidone, N-cyclohexylpyrrolidone, dimethyl sulfoxide, dimethylformamide or dimethylacetamide. Suitable apolar vehicle systems are paraffinic hydrocarbons. Mixtures of solvents can also be employed. The solvents and vehicles employed are preferably chemically inert toward the starting compounds reacted in methods a., b., c., and d.

In methods a., b., c., and d., therefore, polyurea-comprising solutions are obtained, the polyureas thereby preferably being present in dissolved form as solutions in at least one solvent and/or vehicle. The polyurea-comprising solution is a homogeneous mixture of the poly-urea of the invention and one or more solvents and/or vehicles, preferably one or more of the solvents and/or vehicles described above, the polyurea that is present being inseparable by simple filtration from the solvent/vehicle. A polyurea solution differs from suspensions or emulsions of a polyurea in that the polyurea is in solution in the solvent/vehicle system, and not present in the form of ultrasmall dispersed particles.

In all four methods, component K contains either two primary amine groups or one primary amine group and one OH group as isocyanate-reactive groups, and component L contains at least one primary amine, one secondary amine or one OH group as isocyanate-reactive group.

The polyurea of the invention can also be recovered after the conclusion of the reaction, by removal of the volatile constituents, as for example by evaporation of the solution, in the form of a solid.

It has also emerged as being advantageous to use liquid salts, known as ionic liquids, of the kind described in the publication by Zhang et al., J. Phys. Chem. Ref. Data 2006, vol. 35 (4), 1475, for example, as a reaction medium for preparing the polyureas of the invention. "Ionic liquids" for the purposes of the present invention are organic salts, or mixtures of organic salts, whose melting points are below 80° C., their melting points being preferably below 50°, more preferably below 30°, and very preferably below 20° C. The ionic liquids that are particularly preferred herein are liquid at room temperature (25° C.). They can be used in place of the polar aprotic solvents, in the same quantities as the solvent.

The reactions may take place in the presence of soluble inorganic lithium compounds, such as lithium chloride or lithium nitrate, for example. When liquid salts are used it is possible to forego the use of lithium salts.

The amount of substance of lithium compound is preferably 0.2 to 2.0 times the amount of substance of component K. The amount of substance is preferably 0.5 to 1.5 times, more preferably 0.6 to 1.0 times, the amount of substance of component K.

In the processes for preparing the polyureas of the invention it is advantageous to use lithium compounds or liquid salts, in order to increase the storage stability of the rheology control agent systems.

The choice of the respective reaction conditions (reaction temperature, reaction time, metering times, catalyst such as organotin compounds or tertiary amines, etc.) are known to the skilled person and are illustrated in more detail in the working examples. The weight-average molecular weight of the products is adjusted via the ratios f of the individual components.

As a diisocyanate component, compounds are used which comprise the radicals, $R^2$, $R^3$, $R^4$, $R^5$ and/or $R^6$. This encompasses aliphatic, cycloaliphatic, aromatic or aryl-aliphatic diisocyanates alone or mixtures thereof. Specific examples of such diisocyanates are 1,4-tetra-methylene diisocyanate, 1,6-hexamethylene diisocyanate, 2,2,4-trimethyl-1,6-hexamethylene diisocyanate, 1,10-decamethyiene diisocyanate, 1,4-cyclohexane diisocyanate, isophorone diisocyanate, p-phenylene diisocyanate, m-phenylene diisocyanate, 2,6-toluene diisocyanate, 2,4-toluene diisocyanate and mixtures thereof, p- and m-xylylene diisocyanate, 4,4'-diisocyanatodicyclohexyl-methane, 3,3'-dimethyl-4,4'-bis-phenylene diisocyanate, 3,3'-dimethyl-diisocyanatodicyclohexylmethane, the isomer mixtures of 2,4'- and 4,4'-diisocyanatodiphenylmethane, and $C_{36}$ dimer diisocyanate.

Component K preferably consists of aliphatic, araliphatic or aromatic primary diamines or alkanolamines which contain primary amine groups. Primary diamines are preferred.

The component may be composed of a mixture of two or more diamines or alkanolamines. They comprise the radicals $R^2$, $R^3$, $R^4$, $R^5$ and/or $R^6$.

Examples of suitable diamines are ethylenediamine, neopentanediamine, 1,2- and 1,3-propanediamine, 1,6-hexamethylenediamine, 1,8-octamethylenediamine, 1,10-decamethyienediamime, 1,12-dodecamethylenediamine, cyclohexyldiamine, 4,4'-diaminodicyclohexylmethane, 3,3'-dimethyl-4,4'-diaminodicyclohexylmethane, isophoronediamine, 4,7-dioxadecane-1,10-diamine, 4,7,10-trioxadecane-1,12-diamine, polyoxyalkylenediamines which contain ethylene oxide and/or propylene oxide groups, arranged randomly or blockwise (known under the brand name Jeffamin D and Jeffamin ED from Huntsman), having a weight-average molecular weight of between 148 and 4000 g/mol (manufacturer figure), para- and meta-xylylenediamine; 4,4-diaminodiphenylmethane, 3,3-dimethyl-4,4-diaminodiphenylmethane, isomeric phenylene-diamines or isomeric xylylenediamines.

Examples of suitable alkanolamines are monoethanolamine, 3-amino-1-propanol, 2-amino-1-butanol, isopropanolamine, 5-amino-1-pentanol, 2-(2-aminoethoxy)ethanol, N-methyl-ethanolamine, N-ethylethanolamine, N-butylethanolamine, N-(2-hydroxyethyl)aniline are used.

The monoisocyanate component comprises the radicals $R^1$ and $R^7$ of the polyureas of the invention. The monoisocyanate component is preferably selected from aliphatic, cyclo-aliphatic, aromatic or arylaliphatic monoisocyanates, which may be saturated or unsaturated. The monoisocyanate component preferably contains no ethylenically unsaturated double bonds.

Examples are cyclohexyl isocyanate, phenyl isocyanate, n-propyl isocyanate, n-hexyl isocyanate, stearyl isocyanate, 2-isocyanatopropane, m-tolyl isocyanate, p-tolyl isocyanate, benzyl isocyanate, 2-ethylphenyl isocyanate, 1-naphthyl isocyanate or 2-naphthyl isocyanate are used.

Especially preferred are $C_5$-$C_{12}$ arylene-urethane monoiso-isocyanates, more particularly tolylene urethane monoiso-cyanates, of the kind described in EP 1188779.

The monoisocyanate component may comprise polar functional groups such as, for example, carboxyl, ester, nitrile or amide groups or heteroaromatic moieties. Also present may be amine groups and OH groups, with these functional groups being blocked. Where carboxyl groups are present, they too may be blocked. The protective groups are removed after the urethane or urea formation reaction has run its course. Suitable blocking agents and measures for removing them are known to the skilled person. The amino groups may also be in salified or quaternized form. The carboxyl groups may likewise be in salified form.

The component L which is reactive toward isocyanate groups, like the monoisocyanate component, comprises, the radicals $R^1$ and $R^7$ of the polyureas of she invention. Component L is preferably selected from the group consisting of monoalcohols, polyalcohols, primary monoamines, secondary monoamines, primary polyamines, secondary polyamines, monoalkanolamines, and mixtures thereof. The compounds may be linear or branched and also saturated or unsaturated. Preferably they are saturated.

Those OH and/or amine groups which are not intended for reaction with the NCO groups are provided with corresponding protective groups and are removed again after the urethane or urea formation reaction has run its course. These amino groups may also be in salified or quaternized form.

Preference is given to using monoalcohols. Especially preferred are monoalcohols which comprise ethylene oxide and/or propylene oxide and/or butylene oxide and/or styrene oxide groups.

By polyalcohols and polyamines are meant compounds which contain at least two hydroxyl groups and two amine groups, respectively.

Suitable mono- and polyalcohols are n-butanol, 2-ethylhexanol, isotridecyl alcohol, Guerbet alcohols with a chain length of $C_{10}$ to $C_{20}$, oleyl alcohol, linoleyl alcohol, lauryl alcohol, stearyl alcohol, glycerol, dipentaerythritol, polyglycerol, cyclohexanol or the alkyl-substituted derivatives thereof, and benzyl alcohol.

Besides the isocyanate-reactive group, the compounds of component L may comprise other polar functional groups such as, for example, carboxyl, ester, nitrile or amide groups or heteroaromatic moieties. Examples are 12-hydroxystearic acid, lactic acid, malic acid, glycolic acid and the esters or amides thereof, and also compounds such as N-hydroxyethylmorpholine, N-hydroxyethyl-pyrrolidone, N-hydroxyethylimidazole, alkoxylated fatty amines, dimethylethanolamine or triethanolamine. The functional groups are preferably carboxyl groups. One particularly preferred compound as component. L with carboxyl groups is 12-hydroxystearic acid.

Particularly suitable for adjusting the polarity are the alkoxylated derivatives of the alcohols recited above, in which case it is also possible to use lower alcohols such as methanol or allyl alcohol, for example, as a starter component for the alkoxylation. The polyethers thus prepared preferably comprise, among others, ethylene oxide units and/or propylene oxide units in the chain, and may have these units in alternation or in sequences. In the alkoxylation it is also possible to use aromatic alcohols such as phenols or alkylphenols, for example, as a starting component.

In order to adapt the compatibility of the polyureas of the invention to the formulations comprising them, it is also possible to introduce ester groups or polyester groups into the alcohol component, by addition reaction, for example, of lactones such as epsilon-caprolactone with the above-recited alcohols or alcohol ethoxylates, or by use of hydroxylfunctional (meth)acrylates.

The aliphatic amines of component L that are used are preferably linear, branched or cyclic amines having 2 to 44 carbon atoms. Examples are ethylamine, propylamine, isopropylamine, butylamine, sec- and tert-butylamine, 3-methyl-1-butanamine, hexylamine, 2-ethylhexylamine, octylamine, cyclopentylamine, cyclohexylamine, tridecylamine, oleylamine, octadecylamine and the mixtures of $C_{12}$-$C_{22}$ amines that are known under the tradename Armeen from Akzo Nobel. In accordance with the invention it is possible to use not only polyolefin amines such as polyisobutyleneamine, for example, but also, preferably, polyoxyalkylenemonoamines which contain ethylene oxide and/or propylene oxide groups and which are known under the tradename Jeffamin M600, M1000, M2005, and M2070 from Huntsman.

The araliphatic amines are compounds such as benzylamine, 2-phenylethylamine or 1-methylbenzylamine, for example.

Examples of suitable monoalkanolamines are 3-amino-1-propanol, 2-amino-1-butanol, isopropanolamine, 5-amino-1-pentanol, 2-(2-aminoethoxy)ethanol, N-methylethanolamine, N-ethylethanolamine, N-butylethanolamine, and N-(2-hydroxyethyl)aniline.

Likewise suitable are 2-methoxyethylamine, 2-ethoxyethyl-amine, 3-methoxy-1-propylamine, 1-methoxymethylpropyl amine, 1,1-dimethoxy-2-propylamine, 3-ethoxy-1-propylamine, 3-butoxy-1-propylamine, 3-(2-ethylhexyloxy)-1-propylamine, 3-tridecyloxy-propylamine, 3-stearyloxypropylamine, p-methoxybenzylamine, 3,4-dimethoxybenzylamine, p-methoxyphenylethylamine, 3,4-dimethoxyphenylethylamine, 9-phenoxy-4,7-dioxanone-1-amine, 2-methyl-4-methoxyaniline, 2,5-dimethoxyaniline, furfurylamine, tetrahydrofurfurylamine, 2-(4-morpholinyl)ethylamine, 4-(3-aminopropyl)morpholine, (2-ethylhexyloxy)propylamine, and 2,2'-aminoethoxyethanol.

Additionally it is possible to use compounds such as 11-aminoundecanoic acid, glutamic acid, and all known α-, β- and γ-amino acids.

Suitable secondary amines are, for example, diethylamine, dipropylamine, diisopropylamine, dibutylamine, diisobutylamine, dihexylamine, dioctylamine, dicyclo-pentylamine, dicyclohexylamine, ditridecylamine, diocta-decylamine or diphenylamine.

The invention further provides a process for preparing the polyurea. The process can be carried out according to one of the four methods a., b., c. or d. The results are substantially clear to hazy, low- to medium-viscosity solutions having preferred active ingredient fractions between 10%-70% by weight, more preferably 15%-55% by weight, and very preferably 20%—50% by weight, based on the total weight of the solution, or solutions which have undergone waxlike or gelatinous solidification and which can be returned to a liquid, applicable form by gentle heating to 40-70° C. The polyurea does not crystallize out in the solution.

The polyurea solutions can be easily incorporated into paints and polymeric systems, with no need for shearing. Furthermore, as a solution, the polyurea can also be incorporated subsequently. Working with polyurea solutions has the further advantages that they can be processed in dust-free form, are substantially transparent, exhibit particularly good compatibility with other systems, and do not produce bits in paints, for example.

The polyureas of the invention can be used as rheology control agents. In this utility, the fraction of polyurea in a formulation is preferably 0.05% to 10.0% by weight, more preferably 0.1% to 8.0% by weight, and very preferably 0.2% to 5.0% by weight, based on the total weight of the formulation whose rheology is to be influenced.

The invention therefore also relates to formulations which comprise the polyureas of the invention. There is preferably 0.05% to 10.0% by weight, more preferably 0.1% to 8.0% by weight, and very preferably 0.2% to 5.0% by weight of polyurea, based on the total weight of the formulation.

Suitable formulations whose rheology can be controlled are plasticizer, solvent, oils, mineral oils, water and/or solvent comprising compositions in petroleum production (such as techniques of enhanced oil recovery, for example), water and/or solvent comprising compositions for cosmetics, human nutrition, and animal nutrition, dermatology, pharmacy, detergents, crop protection compositions, and also compositions for surface modification, or curable liquid or pastelike polymer systems.

Curable liquid or pastelike polymer systems, following application or other processing, are converted into a solid state by usual thermal processes, but also other mechanisms, such as free-radical copolymerization or polyaddition, for example. These systems are, for example, solventborne, aqueous, and solvent-free paints and coating materials based on binders such as, for example, polyurethanes (1-component and 2-component), polyacrylates, polyester resins, alkyd resins, and epoxy resins, PVC plastisols, PVC organosols, thermoplastics, coatings based on epoxide and unsaturated polyester resins, and also cosmetic formulations, especially nail varnishes, floor-coating compositions, molding compounds, laminating resins, adhesives, sealants, printing inks, jointing compounds, and filling compounds.

The embodiments of the polyureas that are preferred for use are dependent on the field of use and have been presented comprehensively above.

The invention also relates to rheology control agents which comprise at least one polyurea of the invention. The rheology control agents preferably comprise at least one polyurea of the invention and at least one vehicle system. Examples of vehicle systems are organic solvents, which may be polar or apolar. The polyurea or polyureas may be present, for example, in solution or dispersion in the vehicle system. The rheology control agent itself may take the form of a solid, mixture of solids, solution, dispersion such as emulsion or suspension, gel or paste. Where the rheology control agent is to be in the form of a solution, it is preferred to use polar aprotic solvents. Particularly preferred are polyurea-comprising solutions which are obtained from preparation methods a., b., c. or d. A preferred vehicle system for pastes comprises, suitably, apolar solvents such as paraffinic hydrocarbons.

In the rheology control agent there is preferably 10% to 70% by weight, more preferably 15% to 55% by weight, and very preferably 20% to 50% by weight of at least one polyurea of the invention, based in each case on the total weight of the rheology control agent.

The rheology control agent of the invention may comprise constituents such as film-forming resins. Examples of film-forming resins are polyurethanes (1-component and 2-component), polyacrylates, polyester resins, alkyd resins, and epoxy resins, PVC plastisols, PVC organosols, thermoplastics, coatings based on epoxide, and unsaturated polyester resins. The rheology control agent is preferably free from film-forming resins.

The rheology control agent of the invention may further comprise customary additives. Examples of additives are antiblocking agents, stabilizers, antioxidants, pigments, wetting agents, dispersants, emulsifiers, UV absorbers, free-radical scavengers, slip additives, defoamers, adhesion promoters, leveling agents, waxes, nanoparticles, film-forming auxiliaries, and flame retardants. Preferred additives are wetting agents, dispersants and/or emulsifiers.

The rheology control agents are used preferably in the fields of use in which the polyureas present may be used.

The rheology control agents are used in such a way that in a formulation there is preferably 0.05% to 10.0% by weight, more preferably 0.1% to 8.0% by weight, and very preferably 0.2% to 5.0% by weight of polyurea, based on the total weight of the formulation.

The invention is illustrated further below with reference to examples.

EXAMPLES

The percentage figures are, unless anything different is indicated, percentages by weight. The term "active substance" refers to the urea compounds prepared in comparative example 1 and in examples 1 to 6.

Comparative Example 1

As Per Prior Art

First of all a monoadduct is prepared in accordance with patent specification EP 1188779 from a mixture of 2,4- tolylene diisocyanate and 2,6-tolylene diisocyanate (Desmodur 165, Bayer) and butyltriglycol.

In a reaction vessel, with stirring, 4.1 g (0.096 mol) of LiCl are dissolved in 171.4 g of N-ethylpyrrolidone. Thereafter 27.2 g (0.2 mol) of meta-xylylenediamine are added and the clear mixture is heated to 60° C.

Subsequently 154.4 g (0.4 mol) of the monoadduct of Desmodur 165 and butyltriglycol are added dropwise with stirring over the course of 1 hour, such that the temperature does not rise above 65° C. To complete the reaction, the reaction mixture is stirred at 60° C. for 3 hours. A clear and liquid product is obtained. The weight-average molecular weight is 2200 g/mol.

Example 1

In a reaction vessel, with stirring, 0.7 g (0.017 mol) of LiCl is dissolved in 76.4 g of N-methylpyrrolidone. Thereafter 2.3 g (0.017 mol) of meta-xylylenediamine are added and the clear mixture is heated to 35° C. Subsequently 5.9 g (0.034 mol) of tolylene diisocyanate (Desmodur T80, Bayer) are added dropwise with stirring over the course of 1 hour, such that the temperature does not rise above 45° C. After the end of addition of the tolylene diisocyanate, 10.2 g (0.034 mol) of hydroxystearic acid heated to 65° C. are added dropwise. To complete the reaction, the reaction mixture is stirred at 80° C. for 3 hours. This gives a hazy, homogeneous, and liquid product. The weight-average molecular weight is 49000 g/mol.

Example 2

In a reaction vessel, with stirring, 15.1 g (0.36 mol) of LiCl are dissolved in 878.8 g of N-methylpyrrolidone. Thereafter 49.3 g (0.36 mol) of meta-xylylenediamine are added and the clear mixture is heated to 80° C. Subsequently 44.4 g (0.3 mol) of hexamethylene diisocyanate are added dropwise with stirring over the course of 45 minutes. After the end of addition of the hexamethylene diisocyanate, 110.9 g (0.12 col) of a monoadduct prepared by the process described in patent specification EP 1188779 from Desmodur 165 and methoxypolyethylene glycol (MPEG750) are added dropwise. To complete the reaction, the reaction mixture is stirred at 80° C. for 3 hours. This gives a clear, colorless, and liquid product. The weight-average molecular weight, is 34500 g/mol.

Example 3

First of all a monoadduct is prepared in accordance with patent specification EP 1188779 from a mixture of 2,4-tolylene diisocyanate and 2,6-tolylene diisocyanate (Desmodur 180, Bayer) and butylpolyalkylene glycol (Polyglycol B11/50, Clariant).

In a reaction vessel, with stirring, 3.8 g (0.09 mol) of LiCl are dissolved in 146.3 g of dimethyl sulfoxide. Thereafter 10.3 g (0.075 mol) of para-xylylenediamine are added and the clear mixture is heated to 60° C. Subsequently a mixture of 10.4 g (0.06 mol) of Desmodur T65 and 38.2 g (0.03 mol) of the monoadduct of Desmodur T80 and butoxypolyalkylene glycol are added dropwise with stirring over the course of 1 hour, such that the temperature does not rise above 65° C. To complete the reaction, the reaction mixture is stirred at 60° C. for 3 hours. A clear, colorless, and liquid product is obtained. The weight-average molecular weight is 15000 g/mol.

Example 4

In a reaction vessel, 69.6 g (0.4 mol) of Desmodur T80 are introduced and 145.6 g (0.2 mol) of polyester formed from 5 mol of caprolactone and 1 mol of decanol are metered in with stirring over the course of 45 minutes. The temperature during this time is held below 45° C. After the end of the addition, stirring is continued for hours. In a second reaction vessel, with stirring, 12.6 g (0.3 mol) of LiCl are dissolved in 627.4 g of N-ethylpyrrolidone. Thereafter 41.1 g (0.3 mol) of meta-xylylenediamine are added and the solution is heated to 60° C. Subsequently the mixture of the monoadduct and the excess Desmodur T80 from the first reaction vessel is added dropwise with stirring, over the course of 90 minutes, into the second reaction vessel, such that the temperature does not rise above 65° C. To complete the reaction, the reaction mixture is stirred at 60° C. for 3 hours. This gives a clear, colorless, and viscous product. The weight-average molecular weight is 12500 g/mol.

Example 5

In a reaction vessel, 10.0 g (0.045 mol) of isophorone diisocyanate are introduced and 12.1 g (0.045 mol) of oleyl alcohol are metered in with stirring over the course of 15 minutes. The temperature during this time is held below 45° C. After the end of the addition, stirring is continued for a further 2 hours. In a second reaction vessel, with stirring, 4.3 g (0.102 mol) of LiCl are dissolved in 126.3 g of N-methylpyrrolidone. Thereafter 7.9 g (0.068 mol) of hexamethylenediamine are added and the mixture is heated to 60° C. Subsequently a solution of the monoadduct from the first reaction vessel and 7.8 g (0.045 mol) of Desmodur T65 is added dropwise with stirring, over the course of 2 hours, into the second reaction vessel, such that the temperature does not rise above 65° C. To complete the reaction, the reaction mixture is stirred at 60° C. for 3 hours. This gives a yellow and viscous product. The weight-average molecular weight is 7500 g/mol.

Example 6

In a reaction vessel, with stirring, 2.8 g (0.0675 mol) of LiCl are dissolved in 134.7 g of N-methylpyrrolidone. Thereafter 40.5 g (0.0675 mol) of Jeffamin ED600 and 0.915 g (0.015 mol) of aminoethanol are added and the clear mixture is heated to 80° C. Subsequently 13.05 g (0.075 mol) of Desmodur T65 are metered in with stirring over the course of 2 hours, such that the temperature does not rise above 85° C. After the end of the addition, the reaction mixture is stirred at 80° C. for 3 hours. This gives a clear, colorless, and liquid product. The weight-average molecular weight is 20000 g/mol.

Performance Results

The rheology control agents of the invention display performance advantages over the prior art in terms, for example, of compatibility and/or shear stability, and also a universal activity in formulations of different polarity.

Test for Compatibility:

For this purpose the rheology control agents, comprising polyurea and solvent, are incorporated with stirring, using a Dispermat CV at 2 m/s, for 2 minutes at room temperature into a polyester-melamine-based automotive clearcoat. The compatibility of the rheological control agent in the coating system is assessed on the basis of the cloudiness of the wet coating material, one day following incorporation. The assessment is made visually, using a scale of 1-6 (1=clear to 6=very cloudy), and is shown in table 1.

Test formulation 1: Automotive clearcoat based on Setal 1715 VX-74 Setamine US 138 BE 70

| Component | Test formulation 1 | Comparative formulation 1 (as per EP 198519) |
|---|---|---|
| Setal 1715 VX-74 | 52.0% | 33.2% |
| Setal 91715 SS-55 | — | 25.2% |
| Setamine US 138 BB 70 | 24.0% | 24.0% |
| Shellsol A | 6.0% | 4.4% |
| Solvesso 150 | 6.0% | 4.4% |
| xylene | 6.0% | 4.4% |
| isobutanol | 6.0% | 4.4% |
| Total | 100.0% | 100.0% |

Setal 1715 VX-74: polyester binder, 72% in Solvesso 100/ xylene 75:25, from Nuplex Resins
Setamine US138 BB 70: melamine binder, 70% in 1-butanol, from Nuplex Resins
Setal 91715 SS-55: polyester binder, 53% in xylene/ Solvesso 100 53:47, from Nuplex Resins (contains 3.5% by weight sag control agent)
Shellsol A solvent from Shell
Solvesso 100/150 solvents from Exxon Mobil Chemical
Amount added: 0.9% by weight active substance, based on the total formulation.

TABLE 1

| Test formulation 1 | |
|---|---|
| Additive (0.9% by weight active substance, based on total) | Clouding in wet coating |
| Control (without additive) | 1 |
| Comp. ex. 1 | 4 |
| Ex. 2 | 2 |
| Ex. 3 | 1 |
| Ex. 4 | 1 |

| Comparative formulation 1: | |
|---|---|
| | Clouding in wet coating |
| 25.2% by weight Setal 91715 SS-55 (corresponding to 0.9% by weight SCA in the comparative formulation) | 5 |

Test for Shear Stability:

For testing the shear stability of the theology control agents of the invention, the products from the examples are used in an anticorrosion formulation based on Epikote 828. Here again, incorporation takes place simply by stirring with a Dispermat CV at 2 m/s for 2 minutes at room temperature into component A of the listed formulation.

Activity and shear stability are verified 1 day after the incorporation of the products, after addition of the curing agent (component B). For this purpose the coating materials are applied using a stepped coater 50-500 μm and 550-1000 μm to 2801 contrast charts using an automatic applicator from BYK Gardner, at a rate of 5 cm/s, and are dried hanging vertically. The holdout is read off wet in μm, and is a measure of the rheological activity of a product.

To test for shear stability, the samples are applied before and after a shearing load. The shearing load is exerted using a Skandex paint shaker BA S20 (620 rpm, 5 minutes). The smaller the difference in the holdout before and after shearing load, the better the shear stability of a product. The results of the testing are set out in table 2.

Test formulation 2: Anticorrosion primer based on Epikote 828/Epikure 3155

Component A:

| Epikote 828 | 42.0% |
|---|---|
| BYK-066N | 1.0% |
| BYK-P104 | 0.5% |
| Blanc Fixe N | 18.5% |
| Talc AT-1 | 20.0% |
| Bayferrox 130M | 10.0% |
| Dispersing: Dispermat CV, 4 cm toothed disk, 8500 rpm, 30 minutes at 50° C. | |
| BYK-358 | 1.0% |
| Araldite DY-E | 7.0% |
| Total (comp. A) | 100.0% |

Component B:

| Epikure 3155 | 32.7% |
|---|---|

The curing agent is incorporated with stirring.
Epikote 828: liquid bisphenol A epoxide binder, 100% form, from Hexion Specialty Chemicals
Epikure 3155: low-viscosity modified polyamide curing agent, from Hexion Specialty Chemicals
BYK-066 N: solution of foam-destroying poly-siloxanes in diisobutyl ketone, from BYK-Chemie GmbH
BYK-P104: wetting and dispersing agent from BYK-Chemie GmbH
BYK-358: acrylate additive for improving leveling and increasing the gloss, from BYK Chemie GmbH
Blanc Fixe N: synthetic barium sulfate from Sachtleben
Talc AT-1 filler from Norwegian Talc Deutschland GmbH
Bayferrox 130M iron oxide pigment from Lanxess
Araldite DY-E reactive diluent from Huntsman
Level of addition: 0.9% by weight active substance, based on the total formulation.

TABLE 2

| Additives | Holdout [μm] before shearing | Holdout [μm] after shearing |
|---|---|---|
| Control (no additive) | 250 | 250 |
| Comp. ex. 1 | 500 | 350 |
| Example 1 | 850 | 800 |
| Example 5 | 550 | 400 |
| Example 6 | 550 | 450 |

Test for Temperature-Stable Effect

To verify the temperature-stable effect, comp. ex. 1 and example 3 were incorporated into test formulation 1, in the same way as with the procedure described under the test for compatibility. The samples were investigated 1 day after incorporation, using an Anton Paar rheometer MCR 301. For this purpose a disposable plate/plate system with a 0.2 mm slot was used. The shear rate D was $1\ s^{-1}$. The sample was heated at a rate of 6° C./min and characterized rheologically in the temperature range from 30 to 140° C. The temperature stable behavior of example 3 in comparison to comp. example 1 and the control (without additive) is shown in FIG. 1.

Test for Universal Activity:

To verify the universal activity of rheology control agents of the substance class according to the invention, the products are incorporated into diluted binders and into clearcoat formulations with different chemical foundations and polarities. The binders are diluted in order to obtain a comparable processing viscosity. Incorporation is carried out merely with stirring using a Dispermat CV at 2 m/s for 2 minutes at room temperature. One day after the incorporation of the products, a visual inspection is made to determine whether a gel has formed or whether the diluted binder/the clearcoat has remained liquid (+ gel/− no gel).

The results are summarized in table 3.

Level of addition: 2% by weight by active substance, based on the weight of the total composition Test formulations 3:

| Binders/Clearcoats | Diluent/Formula |
|---|---|
| Alkydal F26 | 15% xylene |
| Bayhydrol D 270 | — |
| Epikote 1001 | 20% X/MIBK 3:1 |
| Macrynal SM515 | 15% Buac |
| Nail varnish | NC E400 33% |
| | butyl acetate 54% |
| | isopropanol 6% |
| | plasticizer 7% |
| Plioway AC80 Anl. | 30% in TB K30:Shellsol A 4:1 |
| Worléekyd S 365 | 15% TB K30 |

Alkydal F26: short-oil alkyd, 60% in xylene, from Bayer
Bayhyrol D270: water-dilutable polyester, 70% in W/BTG, from Bayer
Macrynal SM515: OH-functional acrylate, 70% in Buac, from Cytec
Epikote 1001: epoxy resin, 75% in xylene, from Hexion Spec.
Worléekyd S365: long oil alkyd, 60% in TB, from Worlée
Plioway AC80: thermoplastic styrene-acrylate copolymer, 100% form, from Eliokem
NC E400: nitrocellulose, 70% strength in isopropanol, from Waldsrode

TABLE 3

| Binder/clearcoat | Example 1 | Example 3 | Example 5 | Example 6 |
|---|---|---|---|---|
| Alkydal F26 | + | − | − | − |
| Bayhydrol D 270 | − | − | + | + |
| Epikote 1001 | + | + | − | + |
| Macrynal SM515 | − | + | − | + |
| Nail varnish | − | + | − | + |
| Plioway AC80 Anl. | − | − | + | − |
| Worléekyd S 365 | + | − | + | − |

The invention claimed is:

1. A polyurea of the general formula (I)

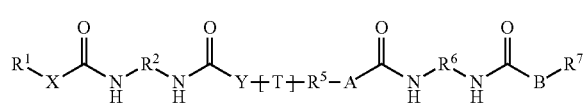

(I)

wherein:
T is a unit comprising at least four urea groups and has the formula (II)

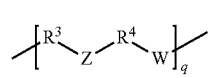

(II)

wherein:
$R^3$ and $R^4$ are each identical or different and independently of one another are branched or unbranched polyester, polyether, $C_4$-$C_{22}$ alkylene, $C_3$-$C_{20}$ cycloalkylene, $C_3$-$C_{20}$ cycloalkenylene, $C_5$-$C_{12}$ arylene or arylalkylene radicals, Z and W are each identical or different and independently of one another are —NHCOO— or —NH—CO—NH—, and q is 2-200;

$R^1$ and $R^7$ independently of one another are branched or unbranched $C_4$-$C_{32}$ alkyl, $C_3$-$C_{18}$ alkenyl, $C_2$-$C_{20}$ alkynyl, $C_3$-$C_{20}$ cycloalkyl, $C_3$-$C_{20}$ cycloalkenyl, $C_5$-$C_{12}$ aryl or arylalkyl, $C_mH_{2m+1}(O-C_nH_{2n})_p$—(O—CH($C_6H_5$)—$CH_2)_u$—, U—$C_6H_4$—$(CH_2)_s$—(O—$C_nH_{2n})_x$—(O—CH($C_6H_5$)—$CH_2)_u$—, $C_mH_{2m+1}$(O—$C_nH_{2n})_p$—(O—CH($C_6H_5$)—$CH_2)_u$—(OOC—$C_vH_{2v})_x$—, U—$C_6H_4$—$(CH_2)_s$—(O—$C_nH_{2n})_p$—(O—CH($C_6H_5$)—$CH_2)_u$—(OOC—$C_vH_{2v})_x$—, $C_4$-$C_{32}$-hydroxyalkyl, $C_4$-$C_{32}$-carboxyalkyl, —$C_mH_{2m}$C(=O)$R^8$—, —$C_mH_{2m}$COOR$^8$—, —$C_mH_{2m}$C(=O)NR$^8$R$^9$— or —$C_mH_{2m}$OC(=O)NR$^8$R$^9$ radicals, it being possible for the radicals to be substituted or unsubstituted, it being possible for the amino groups and/or carboxyl groups to be present in salified or quaternized form, and $C_mH_{2m}$ being a linear or branched alkylene group, and $R^8$ and $R^9$ independently of one another are hydrogen, branched or unbranched $C_1$-$C_{32}$ alkyl, $C_3$-$C_{18}$ alkenyl, $C_2$-$C_{20}$ alkynyl, $C_3$-$C_{20}$ cycloalkyl, $C_3$-$C_{20}$ cycloalkenyl, $C_5$-$C_{12}$ aryl or arylalkyl, $C_1$-$C_{32}$ alkoxyalkyl or $C_1$-$C_{32}$ acyloxyalkyl groups, where m=0-32, n=2-4, x=0-100, u=0-100, v=1-22, p=0-100, s=0-1, U=H, $C_1$-$C_{12}$ alkyl or —$C_6H_5)_{1-4}$, $R^2$ and $R^6$ independently of one another are branched or unbranched $C_4$-$C_{22}$ alkylene, $C_3$-$C_{20}$ cycloalkylene, $C_3$-$C_{20}$ cycloalkenylene, $C_5$-$C_{12}$ arylene or arylalkylene radicals, $R^5$ is a branched or unbranched polyester, polyether, unbranched $C_4$-$C_{22}$ alkylene, $C_3$-$C_{20}$ cycloalkylene, $C_3$-$C_{20}$ cycloalkenylene, $C_5$-$C_{12}$ arylene or arylalkylene radical, B and X independently of one another are —O— or —NR$^{10}$— with R$^{10}$ is H, branched or unbranched $C_1$-$C_{32}$ alkyl, $C_3$-$C_{20}$ cycloalkyl, $C_3$-$C_{20}$ cycloalkenyl $C_5$-$C_{12}$ aryl or arylalkyl radicals, A and Y independently of one another are NR$^{10}$, wherein each R$^{10}$ is, independently, H, branched or unbranched $C_1$-$C_{32}$ alkyl, $C_3$-$C_{20}$ cycloalkyl, $C_3$-$C_{20}$ cycloalkenyl, $C_5$-$C_{12}$ aryl or arylalkyl radicals, and the weight-average molecular weight being 5000 to 70000 g/mol.

2. The polyurea as claimed in claim 1, wherein T comprises no urethane groups.

3. The polyurea as claimed in claim 1, wherein the polyurea has a weight-average molecular weight of 5000 to 12000 g/mol.

4. The polyurea as claimed in claim 1, wherein the polyurea has a weight-average molecular weight of 10000 to 26000 g/mol.

5. The polyurea as claimed in claim 1, wherein the polyurea has a weight-average molecular weight of 24000 to 55000 g/mol.

6. The polyurea as claimed in claim 3, wherein the radicals $R^1$ and/or $R^7$ are substituted by polar functional groups and/or comprise polyester groups and/or polyether groups.

7. The polyurea as claimed in claim 1, wherein the polyurea is present as a solution in at least one solvent and/or vehicle.

8. The polyurea as claimed in claim 1 preparable by
 a. the reaction of at least one diisocyanate with at least one component K which has two NCO-reactive groups, in a molar ratio of diisocyanate to component K of (f+1):f with f≥1, to form intermediately an isocyanate-terminated urea having on average two free isocyanate groups in the molecule, and subsequent complete reaction of the free isocyanate groups of the intermediate with at least one component L that is reactive toward isocyanate groups,
 or
 b. the reaction of at least one diisocyanate with at least one component K which has two NCO-reactive groups, in a molar ratio of diisocyanate to component K of f:(f+1) with f≥1, to form an intermediate having on average two free isocyanate-reactive, terminal groups in the molecule, and subsequent complete reaction of the free isocyanate-reactive groups of the intermediate with at least one monoisocyanate-functional compound,
 or
 c. the reaction of a mixture of at least one diisocyanate and at least one monoisocyanate-functional compound with at least one component K which has two NCO-reactive groups, in a molar ratio of diisocyanate to component K to monoisocyanate-functional compound of f:(f+1):2 with f≥1,
 d. the reaction of a mixture of at least one component K which has two NCO-reactive groups and at least one component L that is reactive toward isocyanate groups with at least one diisocyanate, in a molar ratio of component K to diisocyanate to component L of f:(f+1):2 with f≥1,
 where component K has as NCO-reactive groups either two primary amine groups or one primary amine group and one OH group, and component L has at least one primary amine group, one secondary amine group or one OH group.

9. A process for preparing the polyurea as claimed in claim 1, wherein
 a. at least one diisocyanate is reacted with at least one component K which has two NCO-reactive groups, in a molar ratio of diisocyanate to component K of (f+1):f with f≥1, to form intermediately an isocyanate-terminated urea having on average two free isocyanate groups in the molecule, and
 the free isocyanate groups of the intermediate are subsequently completely reacted with at least one component L that is reactive toward isocyanate groups,
 or
 b. at least one diisocyanate is reacted with at least one component K which has two NCO-reactive groups, in a molar ratio of diisocyanate to component K of f:(f+1) with f≥1, to form an intermediate having on average two free isocyanate-reactive, terminal groups in the molecule, and
 the free isocyanate-reactive groups are subsequently reacted completely with at least one monoisocyanate-functional compound,
 or
 c. at least one diisocyanate is mixed with at least one monoisocyanate-functional compound and this mixture is subsequently reacted with at least one component K which has two NCO-reactive groups, in a molar ratio of diisocyanate to component K to monoisocyanate-functional compound of f:(f+1):2 with f≥1,
 d. at least one component K which has two NCO-reactive groups is mixed with at least one component L that is reactive toward isocyanate groups and this mixture is subsequently reacted with at least one diisocyanate, in a molar ratio of component K to diisocyanate to component L of f:(f+1):2 with f≥1,
 where component K has as NCO-reactive groups either two primary amine groups or one primary amine group and one OH group, and component L has at least one primary amine group, one secondary amine group or one OH group.

10. A rheology control agent comprising at least one polyurea as claimed in claim 1.

11. The rheology control agent as claimed in claim 10, wherein the rheology control agent is free from film-forming resins.

12. The rheology control agent as claimed in claim 10, wherein the fraction of polyurea in a formulation is 0.05% to 10% by weight, based on the total weight of the formulation.

13. The rheology control agent as claimed in claim 12 for rheology control in polar solvents, as antisettling agent, for avoiding the propensity to sagging, for rheology control of baking systems, or for adjusting the sagging characteristics of high-build systems.

14. A formulation comprising a polyurea as claimed in claim 1.

15. The polyurea of claim 1, wherein:
 $R^2$ and $R^6$ are identical or different and are branched or unbranched $C_5$-$C_{12}$ arylene, $C_5$-$C_{12}$ arylalkylene, $C_3$-$C_{20}$ cycloalkylene or $C_4$-$C_{22}$ alkylene radicals;
 $R^3$, $R^4$, and $R^5$ are identical or different and are branched or unbranched polyester, polyether, $C_4$-$C_{22}$ alkylene, $C_3$-$C_{20}$ cycloalkylene, or $C_5$-$C_{12}$ arylene or arylalkylene radicals;
 $R^8$ and $R^9$ are independently of one another, hydrogen or branched or unbranched $C_1$-$C_{32}$ alkyl, $C_1$-$C_{32}$ alkoxyalkyl, $C_5$-$C_{12}$ aryl or arylalkyl radicals; and
 $R^{10}$ is H or a branched or unbranched $C_1$-$C_{32}$ alkyl, $C_3$-$C_{20}$ cycloalkyl, $C_5$-$C_{12}$ aryl or arylalkyl radical.

* * * * *